United States Patent
Lee et al.

(10) Patent No.: US 11,545,776 B2
(45) Date of Patent: Jan. 3, 2023

(54) CONNECTOR ASSEMBLY

(71) Applicants: Hyundai Motor Company, Seoul (KR); Kia Corporation, Seoul (KR)

(72) Inventors: Cheol Hun Lee, Suwon-si (KR); Jong Joo Kim, Suwon-si (KR); Yo Han Kim, Gyeongsan-si (KR); Chan Il Jeon, Gyeongsan-si (KR); Kun Teak Lim, Gyeongsan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/333,293

(22) Filed: May 28, 2021

(65) Prior Publication Data

US 2022/0140516 A1 May 5, 2022

(30) Foreign Application Priority Data

Oct. 30, 2020 (KR) .................. 10-2020-0142750

(51) Int. Cl.
*H01R 13/422* (2006.01)
*H01R 13/436* (2006.01)
*H01R 13/426* (2006.01)

(52) U.S. Cl.
CPC ....... *H01R 13/4223* (2013.01); *H01R 13/426* (2013.01); *H01R 13/4361* (2013.01); *H01R 2201/26* (2013.01)

(58) Field of Classification Search
CPC ............ H01R 2201/26; H01R 13/6272; H01R 13/6275; H01R 13/4223; H01R 13/426; H01R 13/4361; H01R 13/5025; H01R 13/506; H01R 13/213
USPC ................................ 439/352, 353, 355, 350
See application file for complete search history.

(56) References Cited

U.S. PATENT DOCUMENTS

| | | | |
|---|---|---|---|
| 8,469,734 B2* | 6/2013 | Chen | H01R 13/506 439/353 |
| 9,178,308 B1* | 11/2015 | Kim | H01R 24/66 |
| 10,090,613 B2* | 10/2018 | Choi | H01R 13/533 |
| 11,296,461 B2* | 4/2022 | Nawa | H01R 13/6275 |
| 11,342,708 B2* | 5/2022 | Menez | H01R 13/641 |
| 2012/0164868 A1* | 6/2012 | Huang | H01R 43/26 439/353 |
| 2014/0170893 A1* | 6/2014 | Chen | H01R 13/6275 439/357 |
| 2015/0056841 A1* | 2/2015 | Siwek | H01R 13/6271 439/352 |
| 2015/0093927 A1* | 4/2015 | Morello | H01R 13/641 439/352 |
| 2015/0118887 A1* | 4/2015 | Katayanagi | H01R 13/6582 439/353 |

(Continued)

FOREIGN PATENT DOCUMENTS

| | | | | |
|---|---|---|---|---|
| CN | 110247259 A | * | 9/2019 | ......... H01R 13/6275 |
| KR | 20180138525 A | | 12/2018 | |

*Primary Examiner* — Marcus E Harcum
(74) *Attorney, Agent, or Firm* — Slater Matsil, LLP

(57) ABSTRACT

A joint connector includes a cap, a plug received in the cap in a mounting direction, and a clip mounted along the mounting direction to fix the cap and the plug, wherein the plug comprises a flexible locking element configured to simultaneously fix the cap and the clip. The locking element is connected to the plug deformably in a vertical direction with respect to the plug.

20 Claims, 6 Drawing Sheets

(56) References Cited

U.S. PATENT DOCUMENTS

| | | | | |
|---|---|---|---|---|
| 2015/0295354 A1* | 10/2015 | Morello | ............. | H01R 13/6272 |
| | | | | 439/352 |
| 2015/0295357 A1* | 10/2015 | Campbell | ............ | H01R 13/641 |
| | | | | 439/352 |
| 2015/0311629 A1* | 10/2015 | Yagi | ................... | H01R 13/6272 |
| | | | | 439/345 |
| 2015/0349470 A1* | 12/2015 | Horiuchi | .............. | H01R 13/641 |
| | | | | 439/353 |
| 2016/0072226 A1* | 3/2016 | Puhl | .................. | H01R 13/6273 |
| | | | | 439/352 |
| 2016/0301158 A1* | 10/2016 | Nagasaka | .......... | H01R 13/6272 |
| 2017/0250501 A1* | 8/2017 | Endo | .................. | H01R 13/6271 |
| 2020/0067232 A1* | 2/2020 | Hayasaka | .......... | H01R 13/6272 |
| 2020/0136310 A1* | 4/2020 | Nishiyama | ......... | H01R 13/6272 |
| 2020/0203886 A1* | 6/2020 | Wu | .................... | H01R 13/6275 |
| 2020/0212627 A1* | 7/2020 | Saito | ................... | H01R 13/639 |
| 2020/0287326 A1* | 9/2020 | Masuda | .............. | H01R 13/639 |
| 2021/0336387 A1* | 10/2021 | Little | ................. | H01R 13/6272 |
| 2021/0376539 A1* | 12/2021 | Maejima | ............ | H01R 13/6594 |
| 2022/0052484 A1* | 2/2022 | Nakamura | ......... | H01R 13/6272 |
| 2022/0059970 A1* | 2/2022 | Shiga | .................. | H01R 13/639 |

\* cited by examiner

CONNECTOR ASSEMBLY

CROSS-REFERENCE TO RELATED APPLICATIONS

This application claims the benefit of Korean Patent Application No. 10-2020-0142750, filed on Oct. 30, 2020, which application is hereby incorporated herein by reference.

TECHNICAL FIELD

The present disclosure relates to a joint connector.

BACKGROUND

A wiring harness is where wires used for ignition, lighting, charging, and the like of a vehicle are bound. The wiring harnesses are installed throughout a vehicle, from a headlamp at the front end of the vehicle to a rear lamp at the rear end of the vehicle around a battery. The wiring harnesses for vehicles have circuit components, such as power/signal input and ground/signal output, and the same circuit components need to be connected to each other.

Joint connectors are used to connect the same circuit components, e.g., power/ground, indicator lamps, communication signals, etc., of the wiring harnesses to each other. The joint connectors can reduce the number of circuits and simplify configuration of circuits and circuit paths.

As an example of such joint connectors, known is a joint connector in which a clip is engaged with a connector housing. However, this type of joint connector requires a structure that allows easy assembly and securely holds its components together to prevent separation of the components. Also, the structure must prevent vibration or noise caused by gaps between components, like between the housing and the clip.

The foregoing is intended merely to aid in the understanding of the background of the present disclosure, and is not intended to mean that the present disclosure falls within the purview of the related art that is already known to those skilled in the art.

Korean Patent Application Publication No. 10-2018-0138525 (published on Dec. 31, 2018) describes information related to the present subject matter.

SUMMARY

Embodiments of the present disclosure can solve problems associated with prior art.

The present disclosure relates to a joint connector. Particular embodiments relate to a joint connector capable of providing improved engagement between a cap, a plug, and a clip and of reducing occurrence of noise caused by vibration of the cap, the plug, and the clip.

Embodiments of the present invention provide a joint connector that is easily assembled and disassembled.

Embodiments of the present invention provide a joint connector exhibiting improved fixing performance, thereby reducing the manufacturing costs thereof.

Embodiments of the present invention provide a joint connector having an improved fixing structure, thereby reducing the occurrence of vibration and noise.

In one aspect, an embodiment of the present invention provides a joint connector including a cap, a plug received in the cap in a mounting direction, and a clip mounted in the mounting direction to fix the cap and the plug. The plug includes a flexible locking element fixing the cap and the clip simultaneously.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
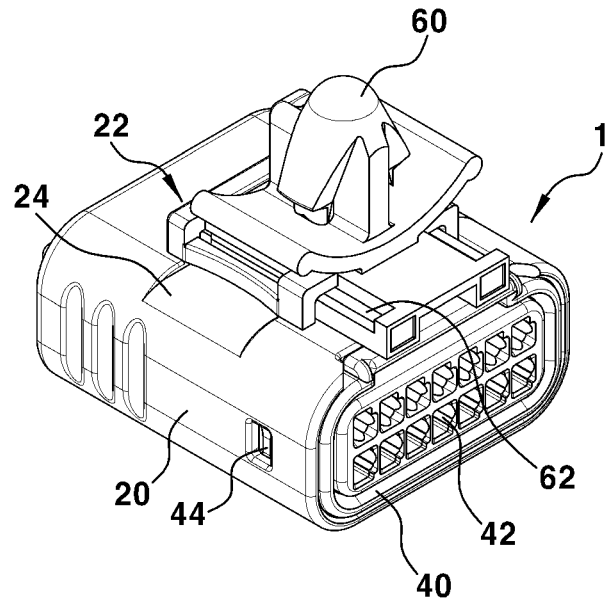
FIG. 1 is a perspective view of a joint connector according to embodiments of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter, preferred embodiments of the present disclosure will be described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Throughout the specification, the term "mounting direction D" refers to a direction in which a plug 40 and a clip 60 are mounted to a cap 20. The term "mounting direction D" is used herein to specify positions of each element more clearly.

Hereinafter, the present disclosure will be described in detail with reference to the accompanying drawings.

As shown in FIG. 1, a joint connector 1 according to embodiments of the present invention includes a cap 20, a plug 40, and a clip 60.

Figure 2A:
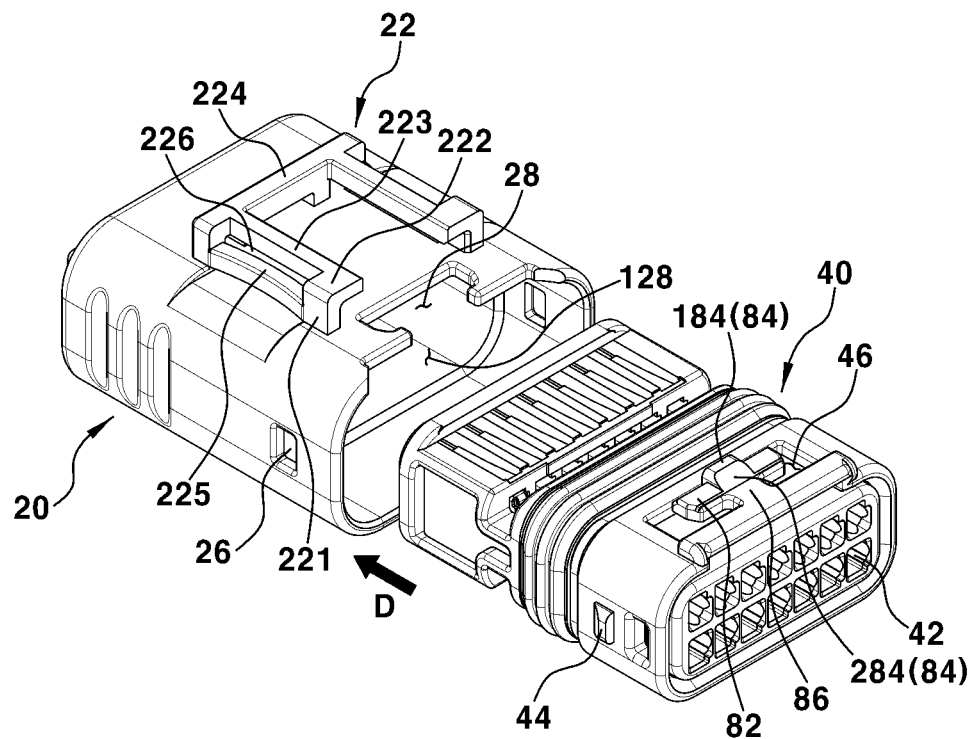
FIG. 2A is an exploded perspective view of a cap and a plug of the joint connector according to embodiments of the present invention.
Figure 2B:
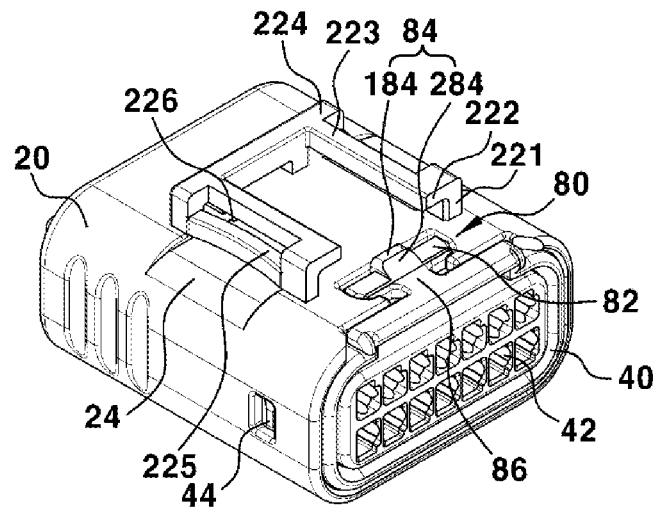
FIG. 2B is a coupled perspective view of the cap and the plug of the joint connector according to embodiments of the present invention.

Referring to FIGS. 2A and 2B, an empty space is provided inside the cap 20. The plug 40 is received in the empty space.

A guide 22 is provided on the upper surface of the cap 20. The guide 22 serves to guide the movement of the clip 60 when the clip 60 is attached to or detached from the cap 20. The guide 22 is also designed to secure the clip 60 to the cap 20 after the clip 60 is mounted to the cap 20. According to an embodiment of the present invention, the cap 20 includes a first part 221, a second part 222, a third part 223, and a fourth part 224.

The first part 221 and the second part 222 are provided in the cap 20 near where the clip 60 first meets the guide 22 along the mounting direction D when the clip 60 is coupled to the guide 22, and the first part 221 and the second part 222 may be arranged at both sides of the cap 20. The first part 221 protrudes substantially perpendicularly to the surface of the cap 20, and the second part 222 is bent and extends in a horizontal direction from the first part 221 toward the center of the cap 20.

At least a portion of the second part 222 protrudes in the mounting direction D to form the third part 223. The third part 223 extends perpendicular to the second part 222 in the mounting direction D of the clip 60. The distal end of the third part 223 is connected to the fourth part 224. The fourth part 224 protrudes from the surface of the cap 20 and extends perpendicular to the mounting direction D of the clip 60, i.e., in the lateral direction of the cap 20. The fourth part 224 is where the mounting of the clip 60 ends. The fourth part 224 serves to stop the clip 60 from moving beyond the guide 22 and to hold the position of the clip 60 relative to the cap 20.

According to some embodiments of the present invention, the guide 22 includes a bounce part 225 connecting the first part 221 and the fourth part 224. The bounce part 225 is flexible and curved laterally inward of the cap 20 to deform when pressed. The bounce part 225 connects the first part 221 and the fourth part 224 and may connect to a certain point of the first part 221 and to a certain point of the fourth part 224. In this case, a slit 226 is formed such that the inner side of the guide 22 and the outer side of the guide 22 communicate between the third part 223 and the bounce part 225 and between the bounce part 225 and the surface of the cap 20. Accordingly, when the clip 60 is mounted to the cap 20, as shown in FIG. 1, it is possible to observe the clip 60 from the outside through the slit 226. In addition, due to this configuration, the bounce part 225 is movable along the surface of the cap 20 and may elastically move outward.

According to some embodiments of the present invention, the cap 20 includes an inclined portion 24. The inclined portion 24 is provided on the surface of a portion of the cap 20 that adjoins the bounce part 225. When the bounce part 225 is pressed and moved laterally outwards, the bounce part 225 comes into contact with the inclined portion 24. When the clip 60 is mounted to the cap 20, then the bounce part 225 is deformed outwards because of the clip 60, which causes the inclined portion 24 to secure the clip 60 more tightly.

The cap 20 may have communication portions 26 piercing both side surfaces of the cap 20 to allow the inside of the cap 20 and the outside of the cap 20 to communicate with each other. As will be described later, the communication portions 26 may provide enhanced engaging force between the cap 20 and the plug 40.

The cap 20 further includes a cut-out portion 28. The cut-out portion 28 is arranged near the open end of the cap 20 into which the plug 40 enters in the mounting direction D. A locking element 80, which will be described later, is fitted into the cut-out portion 28. The cut-out portion 28 may expand along the mounting direction D of the cap 20. In other words, an opening 128 of the cut-out portion 28 provided at the open end of the cap 20 is smaller in the lateral direction than other parts of the cut-out portion 28. The lateral length of the cut-out portion 28 is the smallest at the open end of the cap 20.

According to an embodiment of the present invention, the cap 20 is made of flexible material. As a non-limiting example, the flexible material includes polypropylene. Conventionally, the cap has been made of comparatively rigid yet costly material, such as polyamide 66 (PA66) and polybutylene terephthalate (PBT), to securely hold the clip. On the other hand, in the joint connector according to embodiments of the present invention having the structure described above, the cap may be made of more flexible material, thereby reducing manufacturing costs of the joint connector. According to some embodiments of the present invention, the plug 40 instead of the cap 20 may be formed of flexible material. In other words, any one of the cap 20 and the plug 40 may be made of more flexible material than that used before. Due to the fixing structure according to embodiments of the present invention, both the cap 20 and the plug 40 may be made of the same material as that used for the conventional art or may be made of more flexible material than that used for the conventional art, which can reduce the manufacturing costs of the joint connector.

Referring to FIGS. 2A and 2B, the plug 40 is configured to be inserted into the empty space in the cap 20. The plug 40 includes a plurality of compartments 42 into which terminals (not shown), to which wires are connected, are inserted. The plug 40 includes coupling protrusions 44 protruding from each side of the plug 40. When the plug 40 is received in the cap 20, the coupling protrusions 44 are inserted into the respective communication portions 26 in the cap 20, thereby providing increased force for fixing the plug 40 to the cap 20.

The plug 40 is provided with a locking element 80. The locking element 80 serves to fix the cap 20 and the clip 60 at the same time. The locking element 80 is made flexible such that the locking element 80 is elastically engaged with the cap 20 and the clip 60. In order to allow the locking element 80 to move flexibly, the plug 40 includes a concave portion 46 recessed from the surface of the plug 40. The locking element 80 is coupled to the plug 40 to be vertically movable inside the concave portion 46.

The locking element 80 is formed at a portion of the plug 40 at which the locking element 80 is capable of simultaneously contacting the cap 20 and the clip 60. According to an embodiment of the present invention, the locking element 80 is formed on the upper surface of the plug 40.

According to embodiments of the present invention, the locking element 80 includes a wing 82, an elevated portion 84, and a connection portion 86. The wing 82 extends laterally within the concave portion 46. The wing 82 may include a pair of wings 82 extending bilaterally.

The elevated portion 84 protrudes from the surface of the locking element 80, preferably upwards. The elevated portion 84 may include a tip portion 184, which protrudes upwards farthest from the locking element 80, and a slope portion 284. The slope portion 284 may protrude from the surface of the locking element 80 to be inclined at an acute angle measured clockwise with respect to the mounting direction D.

The locking element 80 is connected to the plug 40 via the connection portion 86. The connection portion 86 protrudes from the plug 40 within the concave portion 46 in the mounting direction D. The wings 82 bilaterally extend from the connection portion 86. The elevated portion 84 protrudes from the connection portion 86 in a direction perpendicular to the mounting direction D. Specifically, the elevated portion 84 gradually protrudes in a direction perpendicular to the mounting direction D to be inclined in the mounting direction D.

The lateral length of the connection portion 86 may be smaller than the sum of the length of the wings 82 and the length of the elevated portion 84 in the lateral direction. Further, the connection portion 86 serves as a pivotal point. The locking element 80 is configured to be pivotally movable up and down about the connection portion 86.

Figure 3A:
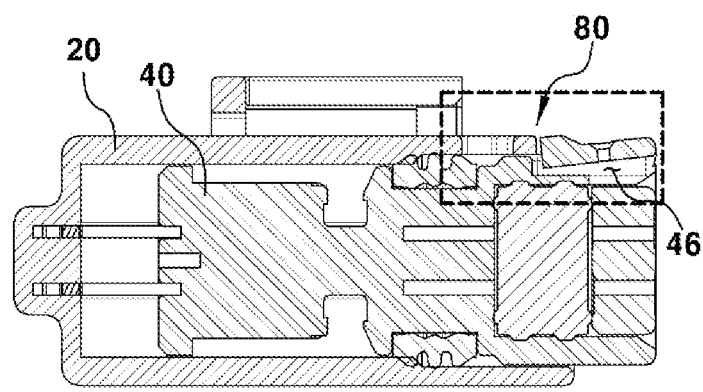
FIG. 3A is a cross-sectional view taken in the mounting direction of the cap and the plug of the joint connector according to embodiments of the present invention, which illustrates the process in which the plug is assembled with the cap.
Figure 3B:
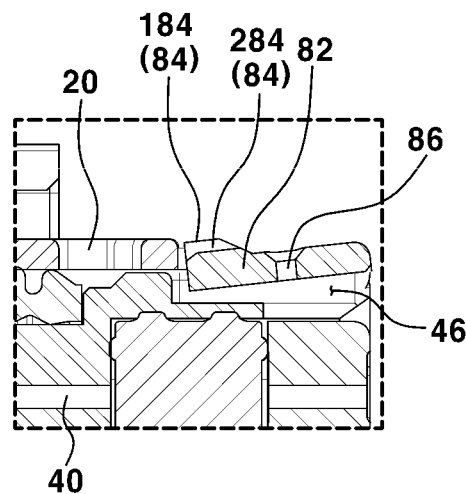
FIG. 3B is a partially enlarged view of the portion indicated by the dotted lines in FIG. 3A.

The locking element 80 is engaged with the cut-out portion 28. Referring to FIGS. 3A and 3B, because the lateral length of the opening 128 in the cut-out portion 28 is smaller than the lateral length of the locking element 80, in order to engage the locking element 80 with the cut-out portion 28, the locking element 80 is pressed downwards, slanted within the concave portion 46, and then inserted into the cut-out portion 28. The connection portion 86 is received in the opening 128, and the wings 82 and the elevated portion 84 are received in the cut-out portion 28. According to embodiments of the present invention, the plug 40 and the cap 20 achieve secure connection after the locking element 80 is inserted into the cut-out portion 28, unless the locking element 80 is pressed downwards.

The clip 60 is mounted after the cap 20 and the plug 40 are first assembled with each other in order to provide increased engagement between the cap 20 and the plug 40.

The clip 60 includes sliding portions 62. The sliding portions 62 are recessed from the surface of the clip 60 at each side of the clip 60 and extend in the longitudinal direction of the clip 60. The sliding portions 62 are slidable along the guides 22 and have shapes engageable with the guides 22. More specifically, the second part 222 and the third part 223 mate with the sliding portions 62.

Figure 4:
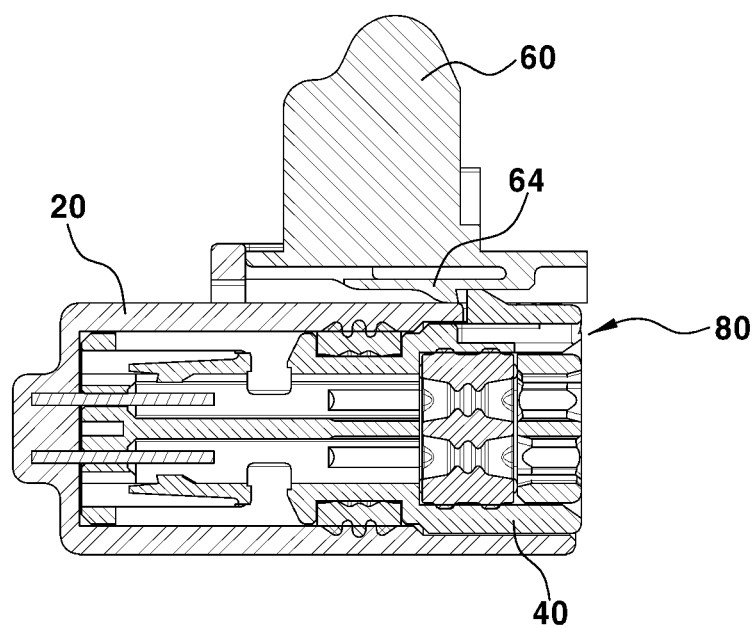
FIG. 4 is a cross-sectional view taken in the mounting direction of the joint connector according to embodiments of the present invention, which illustrates a completely assembled state.

Referring to FIG. 4, the clip 60 includes a fixing protrusion 64 protruding from the lower surface of the clip 60. According to an embodiment of the present invention, the fixing protrusion 64 includes a leading edge 164 and a trailing edge 264. The leading edge 164 is a portion that first meets the plug 40 when the clip 60 is mounted, and the trailing edge 264 is formed at the rear end of the leading edge 164 in the mounting direction of the clip 60.

Figure 5A:
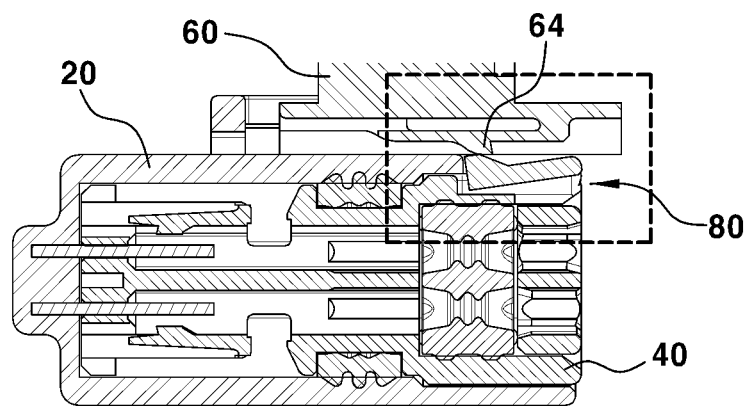
FIG. 5A is a cross-sectional view taken in the mounting direction of the joint connector according to embodiments of the present invention, which illustrates the process of mounting a clip.
Figure 5B:
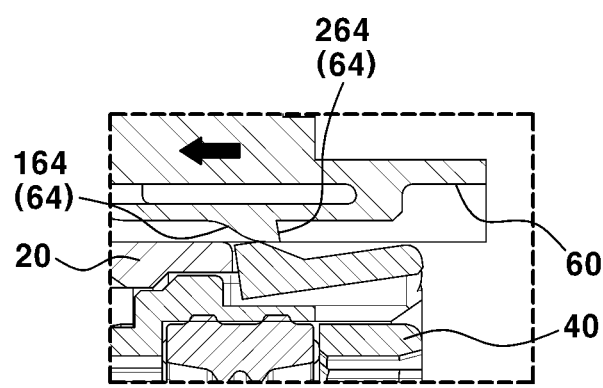
FIG. 5B is a partially enlarged view of the portion indicated by the dotted lines in FIG. 5A.

The leading edge 164 protrudes from the lower surface of the clip 60 at a predetermined angle. The leading edge 164 may be inclined to have an acute angle measured clockwise from a direction opposite the mounting direction of the clip 60. That is, the leading edge 164 gradually protrudes from the lower surface of the clip 60 and is declined in a direction opposite the mounting direction D. Further, the declination of the leading edge 164 may be substantially the same as or similar to the inclination of the elevated portion 84. As shown in FIGS. 5A and 5B, when the clip 60 is mounted, the leading edge 164 comes into contact with the locking element 80 and presses the locking element 80. The leading edge 164 moves over the slope portion 284 of the elevated portion 84 and presses the locking element 80. When the leading edge 164 climbing the slope portion 284 reaches the tip portion 184, the locking element 80 is deformed to move downwards within the concave portion 46. When the fixing protrusion 64 moves over the tip portion 184 and is completely mounted, the fixing protrusion 64 is fixed while being in contact with the cap 20. After completion of assembly of the clip 60, the locking element 80 fixes the clip 60 while being in contact with the lower surface of the clip 60. Accordingly, it is possible to prevent the clip 60 from being separated from the cap 20 due to external impacts during transportation of the assembly thereof.

Figure 6:
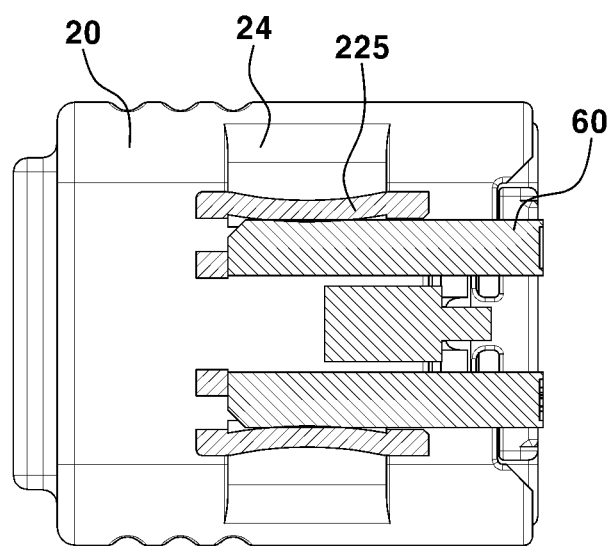
FIG. 6 is a plan sectional view of the joint connector according to embodiments of the present invention.
Figure 7:
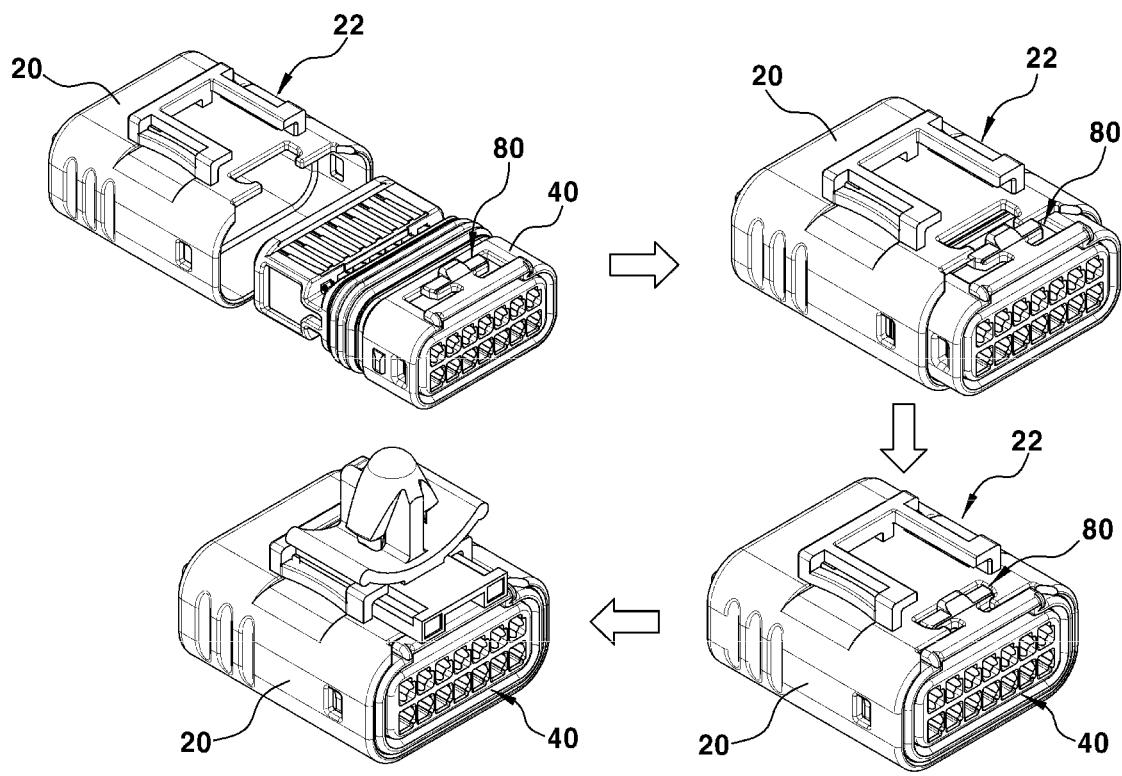
FIG. 7 is a view illustrating the process of assembling the joint connector according to embodiments of the present invention.

As shown in FIG. 6, when the clip 60 is completely assembled with the cap 20 and the plug 40, the clip 60 presses the bounce part 225, and the bounce part 225 is elastically deformed outwards. Due to the inclined portion 24 formed at the cap 20 and the flexibility of the raw material of the cap 20, the force of fixing both sides of the clip 60 increases in proportion to the extent to which the bounce part 225 is pressed outwards, thereby preventing the occurrence of noise caused by vibration.

According to embodiments of the present invention, the cap 20, the clip 60, and the plug 40 are securely fixed to each other using a single element, i.e., the locking element 80 of the plug 40. Accordingly, even when external impacts are exerted on the joint connector 1, it is possible to prevent separation of the plug 40 and clip 60 and to reduce the occurrence of noise attributable to vibration. In addition, the joint connector 1 can be easily disassembled for maintenance. Working hours needed for disassembly can be shortened as the clip 60 and the cap 20 can be detached from each other merely by pressing the locking element 80.

Gaps between the clip, the cap and the plug in the existing fixing structure have resulted in noise due to oscillation and deterioration of emotional quality of a vehicle. Moreover, costly plastic material has been employed, especially for the cap, in order to prevent the clip from being separated from the cap/plug fixing structure during transportation of the assembly thereof or installation of wiring harnesses to a vehicle.

According to embodiments of the present invention, the noise issue can be resolved, and cost-competitive plastic material can be applied.

As is apparent from the above description, according to embodiments of the present invention, there is provided a joint connector capable of increasing engagement between its components.

According to embodiments of the present invention, there is provided a joint connector that is easily assembled and disassembled.

According to embodiments of the present invention, there is provided a joint connector exhibiting improved fixing performance, thereby reducing its manufacturing costs.

According to embodiments of the present invention, there is provided a joint connector having an improved fixing structure that allows reduction in occurrence of vibration and noise.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

It should be understood that the present disclosure is not limited to the above described embodiments and the accompanying drawings, and various substitutions, modifications, and alterations can be devised by those skilled in the art without departing from the technical spirit of the present disclosure.

What is claimed is:

1. A joint connector comprising:
a cap;
a plug received in the cap in a mounting direction; and
a clip mounted along the mounting direction to fix the cap and the plug,
wherein the plug comprises a flexible locking element configured to simultaneously fix the cap and the clip,
wherein the cap comprises an opening at an end surface of the cap and a cut-out portion that extends from the opening,
wherein the locking element comprises a connection portion pivotally connecting the locking element to the plug and protruding from the plug within a concave portion,
wherein the concave portion is recessed from a surface of the plug,
wherein wings are connected to the connection portion and extending bilaterally with respect to the mounting direction within the concave portion,
wherein the opening has a smaller length in a lateral direction with respect to the mounting direction than the cut-out portion, and
wherein the connection portion is positioned in the opening and the wings are positioned in the cut-out portion when the plug and the cap are assembled.

2. The joint connector of claim 1, wherein the locking element is connected to the plug deformably in a vertical direction with respect to the plug.

3. The joint connector of claim 2, wherein the cut-out portion is configured to elastically couple to the locking element through deformation of the locking element.

4. The joint connector of claim 3, wherein the concave is configured to receive the locking element to be movable up and down in a direction perpendicular to the mounting direction.

5. The joint connector of claim 4, wherein a size of the wings substantially corresponds to a size of the cut-out portion.

6. The joint connector of claim 5, wherein the opening has a size corresponding substantially to a size of the connection portion.

7. The joint connector of claim 1, further comprising:
communication portions configured to pierce both sides of the cap; and
coupling protrusions protruding from both sides of the plug and configured to be insertable into the communication portions.

8. The joint connector of claim 1, wherein the cap comprises a plastic comprising polypropylene.

9. A joint connector comprising:
a cap;
a plug received in the cap in a mounting direction; and
a clip mounted along the mounting direction to fix the cap and the plug;
wherein the plug comprises a flexible locking element configured to simultaneously fix the cap and the clip;
wherein the cap comprises a guide configured to guide a mounting of the clip and fixing of the clip; and
wherein the clip comprises a sliding portion configured to be slidable along the guide and to engage with the guide,
wherein the cap comprises an opening at an end surface of the cap and a cut-out portion that extends from the opening,
wherein the locking element comprises a connection portion pivotally connecting the locking element to the plug and protruding from the plug within a concave portion,
wherein the concave portion is recessed from a surface of the plug,
wherein wings are connected to the connection portion and extending bilaterally with respect to the mounting direction within the concave portion,
wherein the opening has a smaller length in a lateral direction with respect to the mounting direction than the cut-out portion, and wherein the connection portion is positioned in the opening and the wings are positioned in the cut-out portion when the plug and the cap are assembled.

10. The joint connector of claim 9, wherein the guide comprises a bounce part being inwardly curved and outwardly deformable by engagement with the sliding portion.

11. The joint connector of claim 10,
wherein the cap comprises an inclined portion sloped downhill laterally and inwardly on a surface of the cap, and
wherein the inclined portion adjoins the bounce part such that the bounce part comes into contact with the inclined portion when deformed.

12. The joint connector of claim 9, wherein the guide comprises:
a first part perpendicularly protruding from a surface of the cap;
a second part bent from the first part and horizontally extending inwardly of the cap;
a third part protruding from the second part and extending in the mounting direction;
and
a fourth part connected to a distal end of the third part and disposed a predetermined distance apart from the first part.

13. The joint connector of claim 12, wherein the guide further comprises a bounce part extending between the first part and the fourth part and curved laterally and inwardly.

14. The joint connector of claim 9, wherein the cap comprises a plastic comprising polypropylene.

15. A joint connector, comprising:
a cap;
a plug received in the cap in a mounting direction; and
a clip mounted along the mounting direction to fix the cap and the plug, the clip comprising a fixing protrusion protruding from a lower surface of the clip,
wherein the plug comprises a flexible locking element configured to simultaneously fix the cap and the clip,
wherein the locking element is connected to the plug deformably in a vertical direction with respect to the plug,
wherein the cap comprises an opening at an end surface of the cap and a cut-out portion extending from the opening, and
wherein the fixing protrusion is configured to press the locking element while the clip is mounted to the cap,
wherein the locking element comprises a connection portion pivotally connecting the locking element to the plug and protruding from the plug within a concave portion,
wherein the concave portion is recessed from a surface of the plug,
wherein wings are connected to the connection portion and extending bilaterally with respect to the mounting direction within the concave portion,
wherein the opening has a smaller length in a lateral direction with respect to the mounting direction than the cut-out portion, and
wherein the connection portion is positioned in the opening and the wings are positioned in the cut-out portion when the plug and the cap are assembled.

16. The joint connector of claim 15, wherein the fixing protrusion comprises a leading edge configured to press the locking element while the clip is mounted to the cap and protruding from the lower surface of the clip with gradient toward an opposite direction to the mounting direction.

17. The joint connector of claim 16, wherein the locking element comprises an elevated portion protruding from the locking element such that the leading edge moves along and keeps in contact with the elevated portion.

18. The joint connector of claim 17, wherein the elevated portion comprises a slope portion inclined to have an acute angle clockwise from the mounting direction, and wherein the leading edge is configured to move in contact with the slope portion.

19. The joint connector of claim 15, wherein at least one of the cap and the plug is formed of a flexible material.

20. The joint connector of claim 19, wherein the flexible material comprises polypropylene.

* * * * *